(12) United States Patent
Kato et al.

(10) Patent No.: US 12,403,910 B2
(45) Date of Patent: Sep. 2, 2025

(54) DRIVING ASSISTANCE DEVICE, VEHICLE, DRIVING ASSISTANCE METHOD, AND STORAGE MEDIUM

(71) Applicant: HONDA MOTOR CO., LTD., Tokyo (JP)

(72) Inventors: Daichi Kato, Wako (JP); Haruhiko Nishiguchi, Wako (JP); Akio Futatsudera, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 276 days.

(21) Appl. No.: 18/111,186

(22) Filed: Feb. 17, 2023

(65) Prior Publication Data

US 2023/0303077 A1   Sep. 28, 2023

(30) Foreign Application Priority Data

Mar. 25, 2022   (JP) .................................. 2022-050383

(51) Int. Cl.
  *B60W 10/00* (2006.01)
  *B60Q 1/34* (2006.01)
  (Continued)

(52) U.S. Cl.
  CPC ....... *B60W 30/18163* (2013.01); *B60Q 1/346* (2013.01); *B60W 50/08* (2013.01);
  (Continued)

(58) Field of Classification Search
  CPC .......... B60W 30/18163; B60W 50/08; B60W 2420/403; B60W 2552/53; B60W 10/00; B60Q 1/346; G06V 20/588
  (Continued)

(56) References Cited

U.S. PATENT DOCUMENTS

| 11,267,468 B2 | 3/2022 | Mizoguchi |
| 2010/0246889 A1* | 9/2010 | Nara ..................... G06V 20/588 382/104 |

(Continued)

FOREIGN PATENT DOCUMENTS

| JP | 2020-163927 A | 10/2020 |
| JP | 2020166393 A | 10/2020 |

(Continued)

OTHER PUBLICATIONS

Japanese Office Action for Japanese Patent Application No. 2022050383 mailed Sep. 19, 2023.

*Primary Examiner* — Shardul D Patel
(74) *Attorney, Agent, or Firm* — Thomas Horstemeyer, LLP

(57) ABSTRACT

A driving assistance device in a vehicle, the driving assistance device comprises a control unit configured to perform a lane change from a traveling lane in which the vehicle travels to a branch lane branching from the traveling lane, by driving assistance capable of automatically performing the lane change on an initiative of a system. The control unit acquires a travel distance in the branch lane, an elapsed time in the branch lane, and information indicating passage of an end position of the branch lane detected based on map information or external environment recognition information, after the lane change is completed by crossing a division line of the traveling lane, and ends the driving assistance in the branch lane.

17 Claims, 4 Drawing Sheets

(51) Int. Cl.
*B60W 30/18* (2012.01)
*B60W 50/08* (2020.01)
*G06V 20/56* (2022.01)

(52) U.S. Cl.
CPC ..... *G06V 20/588* (2022.01); *B60W 2420/403* (2013.01); *B60W 2552/53* (2020.02)

(58) Field of Classification Search
USPC .......................................................... 701/41
See application file for complete search history.

(56) References Cited

U.S. PATENT DOCUMENTS

2020/0284610 A1* 9/2020 Hatayama ............ G08G 1/0969
2020/0307579 A1* 10/2020 Mizoguchi ......... B62D 15/0255
2022/0355799 A1 11/2022 Kawakita et al.

FOREIGN PATENT DOCUMENTS

| JP | 2020185929 A | 11/2020 |
| JP | 2021123179 A | 8/2021 |

* cited by examiner

FIG. 2

|  | MANUAL DRIVING MODE | NORMAL SUPPORT MODE | EXTENSION SUPPORT MODE |
|---|---|---|---|
| ACC | × | ○ | ○ (with map) |
| ACC + LKAS | × | ○ | ○ (with map) |
| ALC | × | × | ○ (with map) |
| ALCA | × | × | ○ (with map) |

DRIVING ASSISTANCE DEVICE, VEHICLE, DRIVING ASSISTANCE METHOD, AND STORAGE MEDIUM

CROSS-REFERENCE TO RELATED APPLICATION(S)

This application claims priority to and the benefit of Japanese Patent Application No. 2022-050383 filed on Mar. 25, 2022, the entire disclosure of which is incorporated herein by reference.

BACKGROUND OF THE INVENTION

Field of the Invention

The present invention relates to a driving assistance device, a vehicle, a driving assistance method, a vehicle, and a storage medium.

Description of the Related Art

Japanese Patent Laid-Open No. 2020-163927 discloses a vehicle control technique for controlling a lane change on a main road of an expressway.

When the lane change is performed from the main road of the expressway to a branch road by automated driving, it is necessary to smoothly end driving assistance control in the branch road from the viewpoint of safety of traffic and smoothness of traffic.

The present invention aims to suppress deterioration in smoothness of traffic while improving safety of traffic, and specifically provides a driving assistance technique for smoothly ending driving assistance in a branch lane after changing a lane from a traveling lane to the branch lane across a division line.

SUMMARY OF THE INVENTION

According to one aspect of the present invention, there is provided a driving assistance device in a vehicle, the driving assistance device comprising a control unit configured to perform a lane change from a traveling lane in which the vehicle travels to a branch lane branching from the traveling lane, by driving assistance capable of automatically performing the lane change on an initiative of a system, wherein the control unit acquires a travel distance in the branch lane, an elapsed time in the branch lane, and information indicating passage of an end position of the branch lane detected based on map information or external environment recognition information, after the lane change is completed by crossing a division line of the traveling lane, and ends the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information.

According to another aspect of the present invention, there is provided a driving assistance method for a driving assistance device in a vehicle, the driving assistance method comprising: performing a lane change from a traveling lane in which the vehicle travels to a branch lane branching from the traveling lane, by driving assistance capable of automatically performing the lane change on an initiative of a system; acquiring a travel distance in the branch lane, an elapsed time in the branch lane, and information indicating passage of an end position of the branch lane detected based on map information or external environment recognition information, after the lane change is completed by crossing a division line of the traveling lane; and ending the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information.

BRIEF DESCRIPTION OF THE DRAWINGS

FIG. 2 is a view illustrating a state transition in a driving assistance function;

DESCRIPTION OF THE EMBODIMENTS

Figure 1:
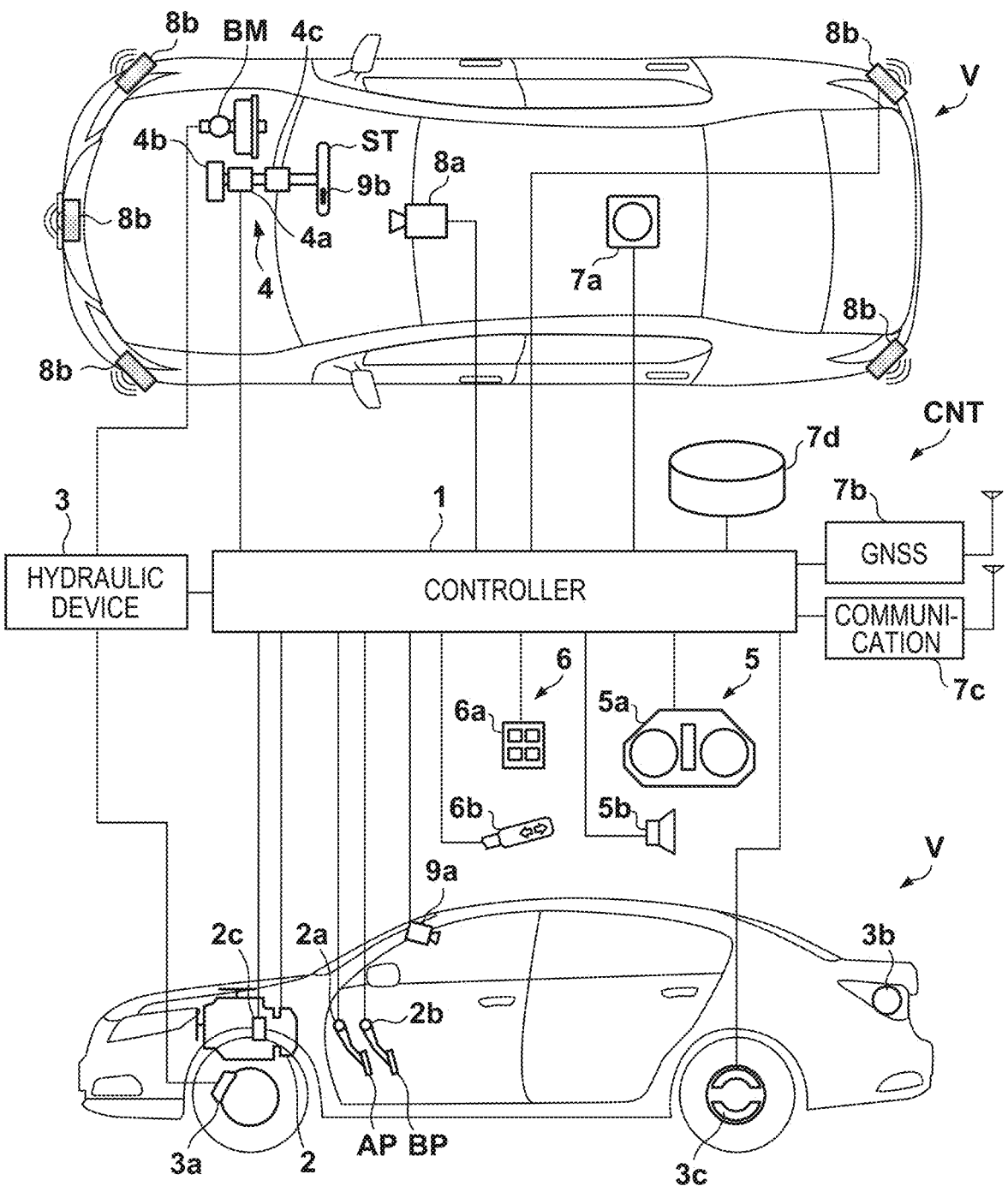
FIG. 1 is a block diagram of a vehicle and a control device according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

An embodiment according to the present invention will be described. FIG. 1 is a block diagram of a vehicle V and a control device CNT (driving assistance device) for the vehicle V according to the present embodiment. In FIG. 1, an outline of the vehicle V is illustrated in a plan view and in a side view. The vehicle V in the present embodiment is, as an example, a sedan-type four-wheeled passenger vehicle, and may be, for example, a parallel hybrid vehicle. Note that the vehicle V is not limited to the four-wheeled passenger vehicle, and may be a straddle type vehicle (motorcycle or three-wheeled vehicle) or a large vehicle such as a truck or a bus.

[Configuration of Vehicle Control Device]

The control device CNT (driving assistance device) includes a controller 1 which is an electronic circuit that performs control of the vehicle V including driving assistance of the vehicle V. The controller 1 includes a plurality of electronic control units (ECUs). The ECU is provided for each function of the control device CNT, for example. Each ECU includes a processor represented by a central processing unit (CPU), a storage device such as a semiconductor memory, an interface with an external device, and the like. The storage device stores a program to be executed by the processor, data to be used for processing by the processor, and the like. The interface includes an input/output interface and a communication interface. Each ECU may include a plurality of processors, a plurality of storage devices, and a plurality of interfaces.

The controller 1 controls driving (acceleration) of the vehicle V by controlling a power unit (power plant) 2. The power unit 2 is a travel driving unit that outputs a driving force for rotating driving wheels of the vehicle V, can include an internal combustion engine, a motor, and an automatic transmission. The motor can be used as a driving source for accelerating the vehicle V, and can also be used as a generator at the time of deceleration or the like (regenerative braking).

In the case of the present embodiment, the controller 1 controls an output of the internal combustion engine or the motor, or switches a gear ratio of the automatic transmission in accordance with the driver's driving operation, the vehicle speed, and the like that have been detected by an operation detection sensor 2a provided in an accelerator pedal AP and an operation detection sensor 2b provided in a brake pedal BP. Note that the automatic transmission includes a rotation speed sensor 2c, which detects the rotation speed of an output shaft of the automatic transmission, as a sensor that detects a traveling state of the vehicle V. The vehicle speed of the vehicle V can be calculated from a detection result of the rotation speed sensor 2c.

The controller 1 controls braking (deceleration) of the vehicle V by controlling a hydraulic device 3. The driver's braking operation on the brake pedal BP is converted into hydraulic pressure in a brake master cylinder BM, and is transmitted to the hydraulic device 3. The hydraulic device 3 is an actuator capable of controlling the hydraulic pressure of hydraulic oil supplied to a brake device 3a (for example, a disc brake device) provided on each of the wheels based on the hydraulic pressure transmitted from the brake master cylinder BM.

The controller 1 can control braking of the vehicle V by performing drive control of an electromagnetic valve or the like included in the hydraulic device 3. In addition, the controller 1 can also constitute an electric servo brake system by controlling distribution of a braking force by the brake device 3a and a braking force by the regenerative braking of the motor included in the power unit 2. The controller 1 may turn on a brake lamp 3b at the time of braking.

The controller 1 controls steering of the vehicle V by controlling an electric power steering device 4. The electric power steering device 4 includes a mechanism for steering front wheels in response to the driver's driving operation (steering operation) on a steering wheel ST. The electric power steering device 4 includes a drive unit 4a including a motor that exerts a driving force for assisting the steering operation or automatically steering the front wheels (sometimes referred to as a steering assist torque), a steering angle sensor 4b, a torque sensor 4c that detects a steering torque borne by the driver (called a steering load torque and distinguished from the steering assist torque), and the like.

The controller 1 controls an electric parking brake device 3c provided on a rear wheel. The electric parking brake device 3c includes a mechanism for locking the rear wheel. The controller 1 can control locking and unlocking of the rear wheel by the electric parking brake device 3c.

The controller 1 controls an information output device 5 that notifies the inside of the vehicle of information. The information output device 5 includes, for example, a display device 5a that notifies the driver of information by an image and/or a voice output device 5b that notifies the driver of information by a voice. The display device 5a can be provided on, for example, an instrument panel or the steering wheel ST. The display device 5a may be a head-up display. The information output device 5 may notify an occupant of information by vibration or light. In addition, the controller 1 receives an instruction input by the occupant (for example, driver) via an input device 6. The input device 6 is disposed at a position operable by the driver, and includes, for example, a switch group 6a with which the driver instructs the vehicle V and/or a direction indicator lever 6b for operating a direction indicator (blinker).

The controller 1 recognizes and determines a current location and a course (orientation) of the vehicle V. In the case of the present embodiment, the vehicle V is provided with a gyro sensor 7a, a global navigation satellite system (GNSS) sensor 7b, and a communication device 7c. The gyro sensor 7a detects a rotation motion (yaw rate) of the vehicle V. The GNSS sensor 7b detects a current location of the vehicle V. In addition, the communication device 7c performs wireless communication with a server that provides map information and traffic information, and acquires these pieces of information. In the case of the present embodiment, the controller 1 determines a course of the vehicle V based on detection results of the gyro sensor 7a and the GNSS sensor 7b, sequentially acquires highly accurate map information related to the course from the server via the communication device 7c, and stores the map information in a database 7d (storage device). Note that the vehicle V may be provided with a sensor configured to detect a state of the vehicle V, such as a speed sensor that detects the speed of the vehicle V or an acceleration sensor that detects the acceleration of the vehicle V.

The controller 1 assists the driving of the vehicle V based on detection results of various detection units provided in the vehicle V. The vehicle V is provided with surroundings detection units 8a and 8b, which are external sensors that detect the outside (surrounding situation (external environment recognition information)) of the vehicle V, and in-vehicle detection units 9a and 9b which are in-vehicle sensors that detect a situation inside the vehicle (a state of the driver). The controller 1 can grasp the surrounding situation (external environment recognition information) of the vehicle V based on detection results of the surroundings detection units 8a to 8b, and perform the driving assistance according to the surrounding situation. In addition, the controller 1 can determine whether the driver is fulfilling a predetermined operation obligation imposed on the driver when performing the driving assistance based on detection results of the in-vehicle detection units 9a to 9b.

The surroundings detection unit 8a is an imaging device (hereinafter, sometimes referred to as a front camera 8a) that captures an image of the front of the vehicle V, and is attached to a vehicle interior side of a windshield at a front portion of a roof of the vehicle V, for example. The controller 1 can extract a contour of a target or a lane division line (such as a white line) on a road by analyzing the image captured by the front camera 8a.

The surroundings detection unit 8b is a millimeter wave radar (hereinafter, sometimes referred to as a radar 8b), detects a target around the vehicle V using radio waves, and detects (measures) a distance to the target and a direction (azimuth) of the target with respect to the vehicle V. In the example illustrated in FIG. 1, five radars 8b are provided, including one provided at the center of a front portion of the vehicle V, two respectively provided at right and left corners of the front portion, and two respectively provided at right and left corners of a rear portion of the vehicle V.

Note that the surroundings detection unit provided in the vehicle V is not limited to the above configuration, and the number of cameras and the number of radars may be changed, and a light detection and ranging (LIDAR) for detecting a target around the vehicle V may be provided.

The in-vehicle detection unit 9a is an imaging device (hereinafter, sometimes referred to as an in-vehicle camera 9a) that captures an image of the inside of the vehicle, and is attached to, for example, the vehicle interior side at the front portion of the roof of the vehicle V. In the case of the present embodiment, the in-vehicle camera 9a is a driver monitoring camera that captures an image of the driver (for example, eyes and a face of the driver). The controller 1 can determine directions of the line of sight and the face of the driver by analyzing an image (face image of the driver) captured by the in-vehicle camera 9a.

The in-vehicle detection unit 9b is a grip sensor (hereinafter, sometimes referred to as a grip sensor 9b) that detects grip of the steering wheel ST by the driver, and is provided in at least a part of the steering wheel ST, for example. Note that the torque sensor 4c that detects the steering torque of the driver may be used as the in-vehicle detection unit.

Examples of the driving assistance of the vehicle V include acceleration/deceleration assistance, lane keeping assistance, and lane change assistance. The acceleration/deceleration assistance is driving assistance (adaptive cruise control (ACC)) that controls the power unit 2 and the hydraulic device 3 to control acceleration/deceleration of the vehicle V within a predetermined vehicle speed while maintaining an inter-vehicle distance from a preceding vehicle. The lane keeping assistance is driving assistance (lane keeping assist system (LKAS)) that controls the electric power steering device 4 to keep the vehicle V inside the lane. The lane change assistance is driving assistance (auto lane changing (ALC) or active lane change assist (ALCA)) that controls the electric power steering device 4 to change a traveling lane of the vehicle V to an adjacent lane. In addition, the driving assistance performed by the controller 1 may include a collision reduction brake for assisting collision avoidance with a target (for example, a pedestrian, another vehicle, or an obstacle) on a road by controlling the hydraulic device 3, an ABS function, traction control, and/or orientation control of the vehicle V.

The driving assistance (acceleration/deceleration assistance, lane keeping assistance, and lane change assistance) of the vehicle V is performed in a plurality of modes including a manual driving mode, a normal assistance mode, and an extended assistance mode. FIG. 2 illustrates driving assistance performed in each of the manual driving mode, the normal assistance mode, and the extended assistance mode of the present embodiment. In the manual driving mode, the acceleration/deceleration assistance, the lane keeping assistance, and the lane change assistance are not performed, and manual driving of the vehicle V is performed by the driver.

In the manual driving mode, when an instruction to set the acceleration/deceleration assistance (ACC) is input by the driver via the input device 6 (for example, the switch group 6a), the acceleration/deceleration assistance is started, and the manual driving mode is shifted to the normal assistance mode. In the normal assistance mode, the lane keeping assistance (LKAS) can be performed in addition to the acceleration/deceleration assistance. The lane keeping assistance is started when an instruction to set the lane keeping assistance is input by the driver via the input device 6 (for example, the switch group 6a) during the setting of the acceleration/deceleration assistance. The acceleration/deceleration assistance and the lane keeping assistance end when an instruction to cancel the setting is input by the driver via the input device 6 (for example, the switch group 6a).

In addition, the driver is required to fulfill predetermined operation obligations such as surrounding monitoring and steering wheel gripping (steering gripping) in the normal assistance mode. When it is determined that the driver does not fulfill the predetermined operation obligations based on the detection result of the in-vehicle detection unit 9b, a notification for prompting the driver to fulfill the predetermined operation obligations is made via the information output device 5.

When traveling on a specific road is started during execution of the normal assistance mode, highly accurate map information is acquired by the communication device 7c. Then, when matching between the highly accurate map information and an image captured by the front camera 8a is successful, the normal assistance mode is automatically shifted to the extended assistance mode. The specific road is a road that provides the highly accurate map information and examples thereof include an expressway and an automobile exclusive road. The highly accurate map information includes not only normal information such as a route and a location of the specific road but also information related to a detailed shape of the specific road such as presence or absence of a curve, a curvature of the curve, an increase or decrease of a lane, and a gradient in the specific road. When the normal assistance mode is shifted to the extended assistance mode, the information output device 5 notifies that the mode has shifted to the extended assistance mode, for example, by changing a light emission color of the display device 5a provided on the steering wheel ST.

In the extended assistance mode, the acceleration/deceleration assistance (and the lane keeping assistance) in cooperation with the highly accurate map information is performed. For example, based on the highly accurate map information, the controller 1 can perform more advanced acceleration/deceleration assistance than that in the normal assistance mode, such as decelerating the vehicle V before a curve or before a point where lanes decrease, or adjusting the speed of the vehicle V according to a curvature of the curve. As in the normal assistance mode, the driver is required to fulfill predetermined operation obligations such as surrounding monitoring and steering wheel gripping in the extended assistance mode. When it is determined that the driver does not fulfill the predetermined operation obligations based on the detection result of the in-vehicle detection unit 9b, a notification for prompting the driver to fulfill the predetermined operation obligations is made via the information output device 5.

In addition, in the extended assistance mode, the lane change assistance can be further performed. In the case of the present embodiment, the lane change assistance includes system-initiated lane change assistance (auto lane changing (ALC)) that automatically changes a lane based on the determination by the controller 1, and driver-initiated lane change assistance (active lane change assist (ALCA)) that automatically changes a lane based on an instruction input by the driver. Note that, in both the system-initiated lane change assistance (ALC) and the driver-initiated lane change assistance (ALCA), the driver is required to fulfill predetermined operation obligations such as surrounding monitoring and steering wheel gripping when the lane change assistance is performed.

The system-initiated lane change assistance (ALC) is started when an instruction to set the ALC in the extended assistance mode is input by the driver via the input device 6 (for example, the switch group 6a). During the ALC setting, the controller 1 sequentially determines whether it is necessary to perform a lane change in order to arrive at a destination set in advance by the driver based on the highly accurate map information (information such as an increase/decrease or branching of a lane), and automatically performs the lane change when determining that it is necessary to perform the lane change. During the ALC setting, one or more lane changes can be performed according to the determination by the controller 1. The ALC ends when the vehicle arrives at the destination or when the specific road ends. The ALC may end in a case where an instruction to cancel the setting is input by the driver via the input device 6 (for example, the switch group 6a).

The driver-initiated lane change (ALCA) is to perform a lane change once in response to an instruction input by the driver, and is executed when an instruction to instruct execution of the ALCA in the extended assistance mode is input by the driver via the input device 6 (for example, the direction indicator lever 6b). In the ALCA, the driver can input an instruction of a direction in which a lane change is to be performed via the input device 6 (direction indicator lever 6b), and the controller 1 automatically performs the lane change to an adjacent lane in the direction for which the instruction is input by the driver. The ALCA can also be performed during the setting of the system-initiated lane change assistance (ALC).

To support the ALCA, states of the lanes on the left and right of the vehicle V may be constantly monitored, and the driver may be notified of the lane to which a lane change can be made. The driver can refer to this notification and instruct the lane change by operating the direction indicator lever 6b, for example, as necessary, and the lane change can be performed based on the instruction. The notification may be performed by displaying a predetermined icon on the display device 5a such that it can be seen whether a change destination lane to which the lane change can be made is the left lane, the right lane, or both the lanes.

(Processing)

Figure 3:
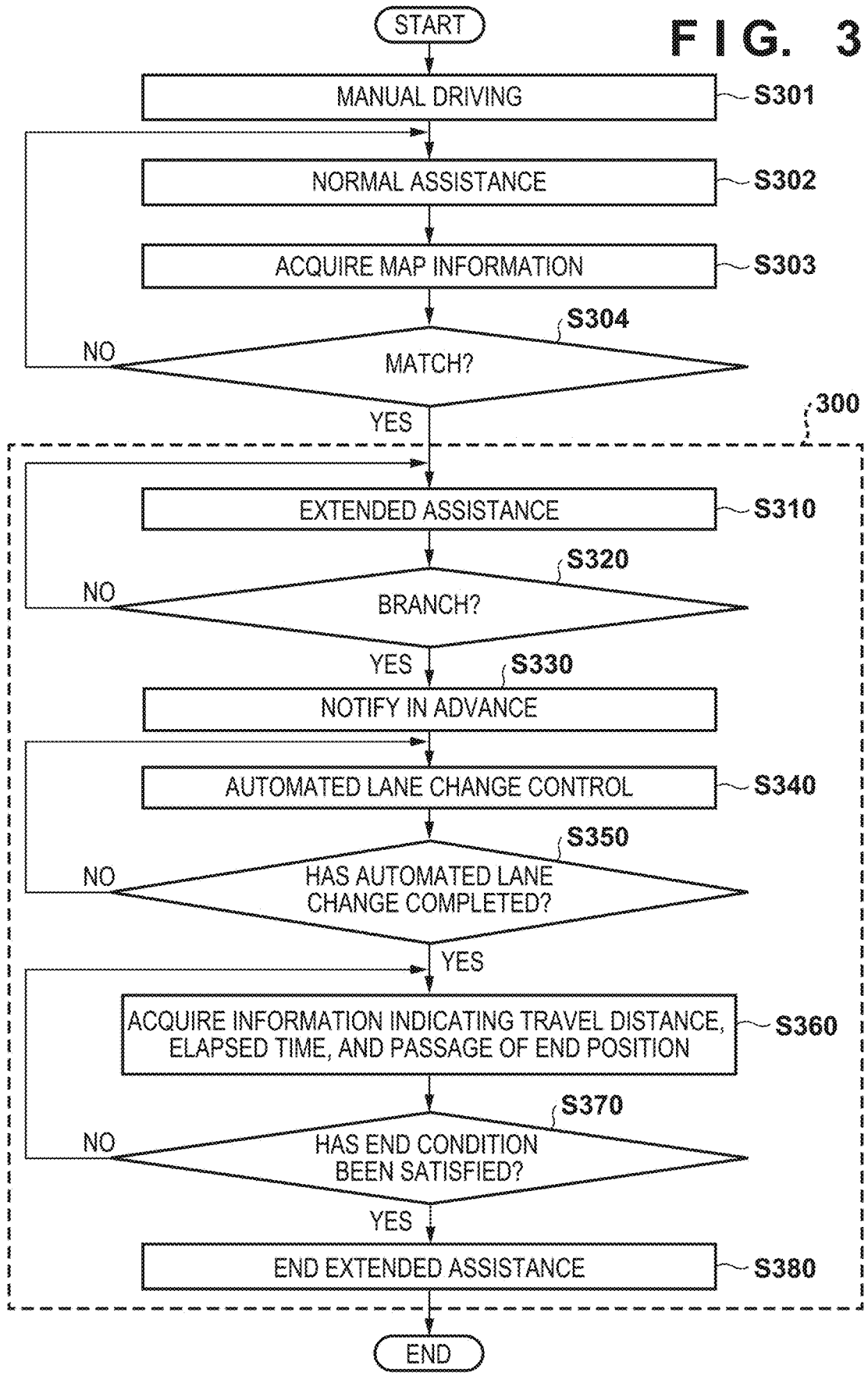
FIG. 3 is a flowchart illustrating a procedure of driving assistance processing executed in the embodiment.
Figure 4:
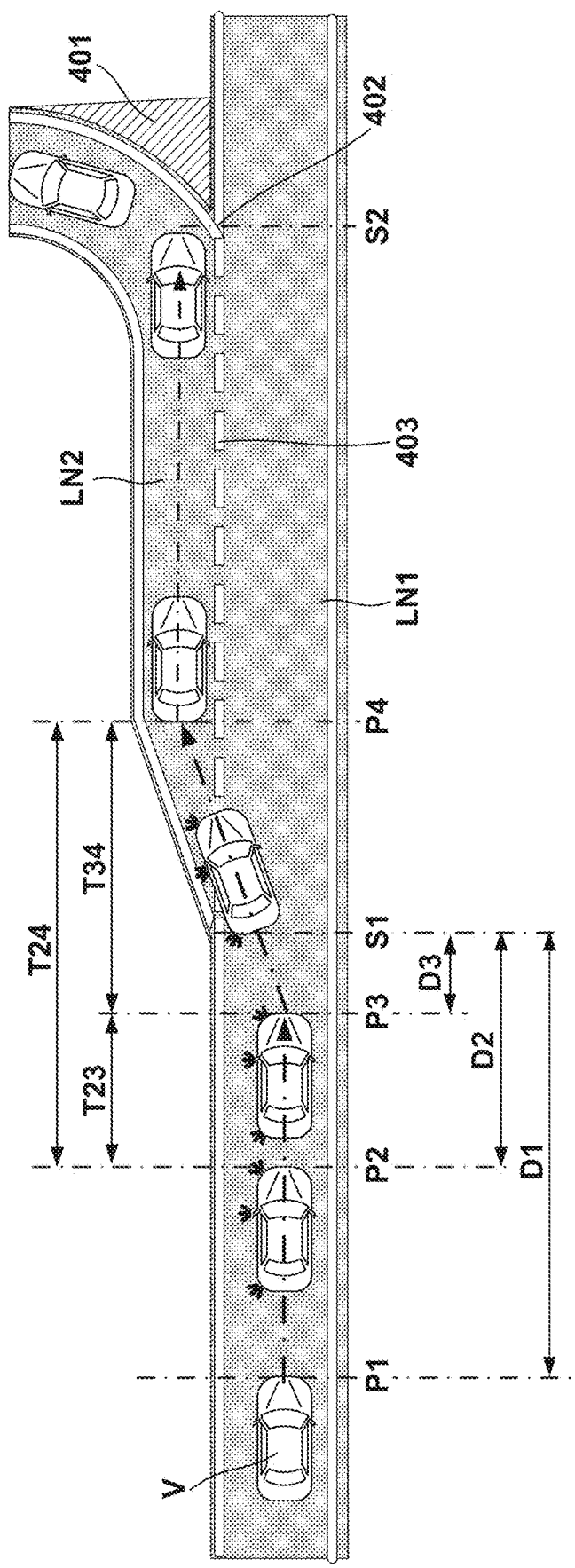
FIG. 4 is a view illustrating an operation of a vehicle near a branch lane.

FIG. 3 is a flowchart illustrating a procedure of driving assistance processing executed in the embodiment, and FIG. 4 is a view illustrating an operation example of the vehicle near a branch lane. The driving assistance processing in the present embodiment is processing in a case where a lane is changed to a branch lane branching from a lane (traveling lane) on which the vehicle V (self-vehicle) is traveling after crossing a division line.

The operation example of the vehicle V illustrated in FIG. 4 illustrates an example in which the system-initiated lane change assistance (ALC) is performed to cross a division line 403 into a branch lane LN2 toward a destination when the vehicle V is traveling in a lane (traveling lane LN1) of a specific road (for example, an expressway, an automobile exclusive road, or the like).

In the embodiment, when performing a lane change to the branch lane LN2 across the division line 403 of the traveling lane LN1, the controller 1 performs a process of ending driving assistance in the branch lane, which will be described below, and does not perform the process of ending the driving assistance in a branch lane (equal branch lane) branching from the traveling lane LN1 into a plurality of directions without crossing the division line.

As described with reference to FIGS. 1 and 2, the controller 1 executes the driving assistance of the vehicle V in the plurality of modes including the manual driving mode, the normal assistance mode, and the extended assistance mode.

In the flowchart of FIG. 3, processes of steps S301 to S304 illustrate a flow of processing as a premise until a transition to traveling in the extended assistance mode. The driving assistance processing in the present embodiment is a procedure of steps S310 to S380 surrounded by a broken line 300.

In the manual driving mode in step S301, when an instruction to set the acceleration/deceleration assistance (ACC) is input by the driver via the input device 6, the acceleration/deceleration assistance is started, and the manual driving mode is shifted to the normal assistance mode in step S302.

In the normal assistance mode in step S302, the lane keeping assistance (LKAS) can be performed in addition to the acceleration/deceleration assistance. In the normal assistance mode, the driver is required to fulfill predetermined operation obligations such as surrounding monitoring and steering wheel gripping (steering gripping). For example, when traveling on a specific road such as an expressway or an automobile exclusive road is started during the execution of the normal assistance mode, highly accurate map information is acquired by the communication device 7c in step S303.

In step S304, the controller 1 performs a comparison (matching) between the highly accurate map information with an image (image information) captured by the front camera 8a. When the highly accurate map information matches the image information (YES in S304), the controller 1 determines that the matching is successful, and the controller 1 automatically shifts the driving assistance mode from the normal assistance mode to the extended assistance mode in step S310.

On the other hand, when it is determined in step S304 that the highly accurate map information does not match the image information (NO in S304), the controller 1 returns the processing to step S302 and maintains the normal assistance mode.

In the extended assistance mode in step S310, it is possible to perform acceleration/deceleration assistance, lane keeping assistance, and lane change assistance in cooperation with the highly accurate map information.

The lane change assistance in the present embodiment includes system-initiated lane change assistance (ALC) that automatically performs a lane change based on the determination of the controller 1, and driver-initiated lane change assistance (ALCA) that automatically performs a lane change in response to an instruction input by the driver.

In the extended assistance mode, the system-initiated lane change assistance (ALC) is provided when an approval instruction to set the ALC is input by the driver via the input device 6 (ALC SW) and the map information matches the image (image information) captured by the front camera 8a (imaging device) (YES in S304). In the system-initiated lane change assistance (ALC), the controller 1 determines whether or not it is necessary to perform a lane change to a branch lane in order to arrive at a destination set based on the highly accurate map information, and determines a branch lane to which the lane change is to be performed when determining that it is necessary to perform the lane change.

In step S320, the controller 1 sequentially determines whether or not it is necessary to perform a lane change to a branch lane in order to arrive at the destination, and returns the processing to S310 and continues the driving assistance in the extended assistance mode when the lane change is not necessary (NO in S320). On the other hand, when it is determined that the lane change is necessary (YES in S320), a branch lane to which the lane change is to be performed is determined.

In FIG. 4, it is assumed that the controller 1 of the vehicle V (self-vehicle) performs driving assistance in the extended assistance mode, and an instruction input (approval) for setting the system-initiated lane change assistance (ALC) is performed by the driver via the input device 6. In FIG. 4, LN1 is the traveling lane (for example, a main road of an expressway or an automobile exclusive road) on which the vehicle V travels, and LN2 is the branch lane branching from the traveling lane LN1.

A reference position S1 in FIG. 4 is a branching position at which branching from the traveling lane LN1 to the branch lane LN2 is started due to a structure of the road. That is, the reference position S1 is a start position (branching position) of the branch lane LN2. An end position S2 is a termination position of the branch lane LN2. Note that a position of an end portion 402 of a zone with diagonal stripes (traffic island) 401 in the vicinity of the end position of the branch lane LN2 may be set as the end position of the branch lane LN2.

A position P1 (notification position) is a position where the driver is notified that the vehicle V is approaching the start position (branch position) of the branch lane LN2, and the controller 1 controls the information output device 5 (the display device 5*a* or the voice output device 5*b*) that notifies the inside of the vehicle of information to give an advance notice of the lane change to the branch lane and to notify in advance that the driving assistance in the extended assistance mode is to be ended in the branch lane. The position P1 is set as a point a predetermined distance (distance D1) before the reference position S1. Here, an end of the driving assistance is an end of the driving assistance in the extended assistance mode, and the controller 1 transitions to the manual driving mode.

A position P2 (blinking start position) is a position where preparation for the lane change is made by turning on the blinker or the like. The position P2 is set as a point a predetermined distance (distance D2) before the reference position S1. As illustrated in FIG. 4, the blinker of a lane change direction (left side in a traveling direction in the example of the present embodiment) is turned on.

A position P3 (change start position) is a position where automated lane change control by the system-initiated lane change assistance (ALC) is started. The position P3 is set as a point a predetermined distance (distance D3) before the reference position S1. Further, a position P4 is a position where the lane change by the lane change control is completed, and the entry of the vehicle V into the branch lane LN2 is completed at the position P4. The controller 1 turns off the blinker when the lane change is completed, and ends the automated lane change control by the system-initiated lane change assistance (ALC).

A time T23 is a time from a start of blinking of the blinker to the start of the lane change, and is at least 3 seconds. A time T34 is a time from the start of the lane change to the completion of the lane change, and is, for example, at least 7 seconds. A time T24 is a time from the start of blinking of the blinker to the completion of the lane change, and is, for example, at least 10 seconds. The time setting is exemplary, and the controller 1 can set the positions P1, P2, and P3 (distances D1, D2, and D3) for starting the processing according to the vehicle speed of the vehicle V such that the time set in each of the times T23, T34, and T24 can be secured.

For example, the controller 1 estimates a time from the start of the lane change to the completion of entry of the vehicle V into the branch lane based on the map information and the vehicle speed of the vehicle V, and sets the position P3 (change start position) such that at least time in which the estimated time is set in advance can be secured.

In addition, the controller 1 starts blinking of the blinker of the vehicle from the position P2 (blinking start position) that is a position a predetermined distance before the reference position S1 where branching of the branch lane starts and is before the change start position where the lane change is started. The controller 1 estimates a time from the start of blinking of the blinker of the vehicle V to the start of the lane change based on the map information and the vehicle speed of the vehicle V, and sets the position P2 (blinking start position) at which the blinking of the blinker of the vehicle V starts such that at least time in which the estimated time is set in advance can be secured.

Returning to the description of S320 in FIG. 3, when determining that the lane change is necessary (YES in S320), the controller 1 determines the branch lane to which the lane change is to be performed.

In step S330, the controller 1 controls the information output device 5 to notify the driver in advance that the vehicle V is approaching the start position (branch position) of the branch lane LN2. In this step, the lane change to the branch lane LN2 and the end of the driving assistance in the branch lane are notified in advance (the position P1 in FIG. 4).

In step S340, the controller 1 executes the automated lane change control by the system-initiated lane change assistance (ALC) (the positions P2 and P3 in FIG. 4).

In step S350, the controller 1 determines whether the automated lane change is completed, and continues the automated lane change control in step S340 when the automated lane change is not completed (NO in S350).

On the other hand, when it is determined in step S350 that the automated lane change is completed (YES in S350: position P4 in FIG. 4), the controller 1 advances the processing to step S360.

In step S360, after the lane change is completed by crossing the division line 403 of the traveling lane LN1, the controller 1 acquires a travel distance in the branch lane, an elapsed time in the branch lane, and information indicating passage of an end position of the branch lane LN2 detected based on map information or external environment recognition information in traveling in the branch lane LN2. Here, the position of the end portion 402 of the zone with diagonal stripes (traffic island) 401 in the vicinity of the end position of the branch lane LN2 may be set as the end position of the branch lane LN2.

In step S370, the controller 1 determines whether or not at least one of the pieces of information acquired in step S360 satisfies an end condition of the driving assistance in the extended assistance mode. When none of the information acquired in step S360 satisfies the end condition (NO in S370), the controller 1 returns the processing to S360 and repeatedly executes the same processing.

On the other hand, when at least one of the pieces of information acquired in step S360 satisfies the end condition of the driving assistance in the extended assistance mode (YES in S370), the processing proceeds to step S380. That is, the controller 1 determines that the end condition is satisfied in a case where the travel distance in the branch lane exceeds a predetermined threshold distance, in a case where the elapsed time in the branch lane exceeds a predetermined threshold time, or in a case of passing through the end position of the branch lane LN2 detected based on the map information or the external environment recognition information, and advances the processing to step S380.

In step S380, the controller 1 ends the driving assistance in the extended assistance mode in the branch lane. The controller 1 transitions to the manual driving mode after the end of the driving assistance in the extended assistance mode. In the manual driving mode, the acceleration/deceleration assistance, the lane keeping assistance, and the lane change assistance are not performed, and manual driving of the vehicle V is performed by the driver.

Note that, when the driving assistance in the extended assistance mode is ended, some functions of the extended assistance mode may be ended in addition to the case of transitioning to the manual driving mode. The extended assistance mode includes a first function (ACC) for controlling acceleration/deceleration of the vehicle V within a predetermined vehicle speed while maintaining an inter-vehicle distance from a preceding vehicle, a second function (LKAS) for maintaining the vehicle V inside a lane, and a third function (ALC or ALCA) for changing a traveling lane of the vehicle to an adjacent lane, and at least one of the first function, the second function, and the third function may be ended by the end of the driving assistance in the extended assistance mode.

Summary of Embodiment

The above embodiment discloses at least the following driving assistance device, vehicle including the driving assistance device, and driving assistance method.

Configuration 1. A driving assistance device (CNT) in a vehicle (1), the driving assistance device comprises a control unit (1) configured to perform a lane change from a traveling lane in which the vehicle travels to a branch lane branching from the traveling lane, by driving assistance (extended assistance mode) capable of automatically performing the lane change (ALC) on an initiative of a system,
  wherein the control unit (1)
  acquires a travel distance in the branch lane, an elapsed time in the branch lane, and information indicating passage of an end position of the branch lane detected based on map information or external environment recognition information, after the lane change is completed by crossing a division line of the traveling lane, and
  ends the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information.

According to the driving assistance device of Configuration 1, it is possible to smoothly end the driving assistance in the branch lane after changing the lane from the traveling lane to the branch lane across the division line.

Configuration 2. The control unit (1) determines whether or not it is necessary to perform the lane change to the branch lane in order to arrive at a destination set based on map information, and determines the branch lane to which the lane change is to be performed when determining that it is necessary to perform the lane change.

According to the driving assistance device of Configuration 2, it is possible to smoothly change the lane from the traveling lane to the branch lane across the division line by determining the branch lane based on the map information.

Configuration 3. The control unit (1) notifies in advance the lane change to the branch lane and the end of the driving assistance in the branch lane, at a notification position (for example, P1) a predetermined distance before a reference position (for example, S1) at which the branching of the branch lane starts.

According to the driving assistance device of Configuration 3, it is possible to reduce the uncomfortable feeling of the vehicle occupant with respect to the lane change operation of the vehicle by performing the notification in advance, and it is possible to smoothly make a transition to the manual driving mode with the end of the driving assistance.

Configuration 4. The control unit (1) has
  a function (for example ALC) of automatically performing the lane change on the initiative of the system,
  a driver-initiated lane change function (for example ALCA) of automatically performing the lane change for each instruction input by a driver, and
  a function in which the system of the vehicle monitors states of lanes on left and right of the vehicle, notifies the driver of the lane to which the lane change is possible, and performs the lane change based on an operation of the driver.

Configuration 5. The control unit (1) provides the function (ALC) of automatically performing the lane change on the initiative of the system in a case where an approval instruction is input by the driver via an input device (for example 6) and map information matches image information captured by an imaging device (for example 8a).

According to the driving assistance devices of Configurations 4 and 5, since the function of automatically performing the lane change on the initiative of the system is provided, it is possible to provide the driving assistance technique capable of further improving the smoothness of traffic while improving the safety of traffic.

Configuration 6. The control unit (1) provides the driver-initiated lane change function (ALCA) in a case where the approval instruction is not input or in a case where the map information does not match the image information.

According to the driving assistance device of Configuration 6, since the driver-initiated lane change function is provided, it is possible to provide the driving assistance function that flexibly responds to the request of the driver while securing the safety and smoothness of traffic.

Configuration 7. The control unit (1) starts the lane change from a change start position (for example P3) a predetermined distance before a reference position (for example S1) at which the branching of the branch lane starts.

Configuration 8. The control unit (1) estimates a time from the start of the lane change to completion of entry of the vehicle into the branch lane based on map information and a vehicle speed of the vehicle, and
  sets the change start position (P3) to enable at least time (for example T34) in which the estimated time is set in advance to be secured.

Configuration 9. The control unit (1) starts blinking of a blinker of the vehicle from a blinking start position (for example P2) that is a position a predetermined distance before the reference position at the which branching of the branch lane starts and before the change start position (P3) at which the lane change is started.

Configuration 10. The control unit (1) estimates a time from the start of the blinking of the blinker of the vehicle to the start of the lane change based on the map information and the vehicle speed of the vehicle, and
  sets the blinking start position (P2) for starting the blinking of the blinker of the vehicle to enable at least time in which the estimated time (for example T23) is set in advance to be secured.

According to the driving assistance devices of Configurations 7 to 10, an operation timing related to the lane change can be planned in advance based on the vehicle speed of the vehicle and the map information, and the lane change control can be performed more smoothly while securing the safety and smoothness of traffic.

Configuration 11. The end position (for example S2) is a termination position of the branch lane, and is a position of an end portion (for example 402) of a traffic island provided near the end position.

According to the driving assistance device of Configuration 11, even in a situation where it is difficult to recognize the end position of the branch lane due to a road structure, the end portion of the zone with diagonal stripes (traffic island) provided in the vicinity of the end position is detected as a target, whereby the end position of the branch lane can be identified.

Configuration 12. The driving assistance includes
a first function (ACC) of controlling acceleration and deceleration of the vehicle within a predetermined vehicle speed while maintaining an inter-vehicle distance from a preceding vehicle, a second function (LKAS) of maintaining the vehicle inside a lane, and a third function (ALC, ALCA) of changing the traveling lane of the vehicle to an adjacent lane, and
at least one of the first function, the second function, and the third function ends with the end of the driving assistance.

Configuration 13. A vehicle having a driving assistance function, the vehicle comprising the driving assistance device according to any one of configurations 1 to 12.

According to the vehicle of Configuration 13, it is possible to provide the vehicle including the driving assistance device capable of smoothly ending the driving assistance in the branch lane after changing the lane from the traveling lane to the branch lane across the division line.

Configuration 14. A driving assistance method for a driving assistance device (CNT) in a vehicle, the driving assistance method comprising:
performing (for example S310-S380) a lane change from a traveling lane in which the vehicle travels to a branch lane (for example LN2) branching from the traveling lane (for example LN1), by driving assistance (extended assistance mode) capable of automatically performing the lane change on an initiative of a system;
acquiring (for example S360) a travel distance in the branch lane, an elapsed time in the branch lane, and information indicating passage of an end position of the branch lane detected based on map information or external environment recognition information, after the lane change is completed by crossing a division line of the traveling lane; and
ending (for example S370, S380) the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information.

According to the driving assistance method of Configuration 14, it is possible to smoothly end the driving assistance in the branch lane after changing the lane from the traveling lane to the branch lane across the division line.

Configuration 15. The storage medium stores a program which causes a computer to execute the driving assistance method described in Configuration 14.

Configuration 16. The program causes a computer to execute the driving assistance method described in Configuration 14.

According to the storage medium of Configuration 15, the storage medium storing the program for causing the computer to execute the driving assistance method described in Configuration 14 can be provided. According to the program of Configuration 16, the program for causing the computer to execute the driving assistance method described in Configuration 14 can be provided.

OTHER EMBODIMENTS

In the present invention, a program for implementing the functions of the above-described embodiment can be provided to a system or a driving assistance device constituting the system via a network or a storage medium, and one or more processors in a computer of the driving assistance device can read the program to execute processing of the driving assistance device.

The invention is not limited to the foregoing embodiments, and various variations/changes are possible within the spirit of the invention.

What is claimed is:
1. A driving assistance device in a vehicle, the driving assistance device comprising
a control unit configured to perform a lane change from a traveling lane in which the vehicle travels to a branch lane branching from the traveling lane, by driving assistance capable of automatically performing the lane change on an initiative of a system,
wherein the control unit
notifies, by way of a display or a voice output device, of an end of the driving assistance in the branch lane before the vehicle enters the branch lane at a notification position a predetermined distance before a reference position at which the branching of the branch lane starts,
acquires a travel distance in the branch lane, an elapsed time in the branch lane, and information indicating passage of an end position of the branch lane detected based on map information or external environment recognition information, after the lane change is completed by crossing a division line of the traveling lane, and
ends the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information.

2. The driving assistance device according to claim 1, wherein the control unit determines whether or not it is necessary to perform the lane change to the branch lane in order to arrive at a destination set based on map information, and determines the branch lane to which the lane change is to be performed when determining that it is necessary to perform the lane change.

3. The driving assistance device according to claim 2, wherein the control unit notifies, by way of a display or a voice output device, of the lane change to the branch lane, at a notification position a predetermined distance before a reference position at which the branching of the branch lane starts.

4. The driving assistance device according to claim 1, wherein the control unit comprises:
a function of automatically performing the lane change on the initiative of the system,
a driver-initiated lane change function of automatically performing the lane change for each instruction input by a driver, and a function in which the system of the vehicle monitors states of lanes on left and right of the vehicle, notifies the driver of the lane to which the lane change is possible, and performs the lane change based on an operation of the driver.

5. The driving assistance device according to claim 4, wherein the control unit provides the function of automatically performing the lane change on the initiative of the system in a case where an approval instruction is input by the driver via an input device and map information matches image information captured by an imaging device.

6. The driving assistance device according to claim 5, wherein the control unit provides the driver-initiated lane change function in a case where the approval instruction is not input or in a case where the map information does not match the image information.

7. The driving assistance device according to claim 1, wherein the control unit starts the lane change from a change start position a predetermined distance before a reference position at which the branching of the branch lane starts.

8. The driving assistance device according to claim 7, wherein
the control unit estimates a time from the start of the lane change to completion of entry of the vehicle into the branch lane based on map information and a vehicle speed of the vehicle, and
sets the change start position to enable at least time in which the estimated time is set in advance to be secured.

9. The driving assistance device according to claim 8, wherein the control unit starts blinking a blinker of the vehicle from a blinking start position that is a position at a predetermined distance before the reference position at which branching of the branch lane starts and before the change start position at which the lane change is started.

10. The driving assistance device according to claim 9, wherein
the control unit estimates a time from the start of the blinking of the blinker of the vehicle to the start of the lane change based on the map information and the vehicle speed of the vehicle, and
sets the blinking start position for starting the blinking of the blinker of the vehicle to enable at least time in which the estimated time is set in advance to be secured.

11. The driving assistance device according to claim 1, wherein the end position is a termination position of the branch lane, and is a position of an end portion of a traffic island provided near the end position.

12. The driving assistance device according to claim 1, wherein the driving assistance includes
a first function of controlling acceleration and deceleration of the vehicle within a predetermined vehicle speed while maintaining an inter-vehicle distance from a preceding vehicle, a second function of maintaining the vehicle inside a lane, and a third function of changing the traveling lane of the vehicle to an adjacent lane, and
at least one of the first function, the second function, and the third function ends with the end of the driving assistance.

13. A vehicle having a driving assistance function, the vehicle comprising the driving assistance device according to claim 1.

14. A driving assistance method for a driving assistance device in a vehicle, the driving assistance method comprising:

performing a lane change from a traveling lane in which the vehicle travels to a branch lane branching from the traveling lane, by driving assistance capable of automatically performing the lane change on an initiative of a system;
notifying, by way of a display or a voice output device, of an end of the driving assistance in the branch lane before the vehicle enters the branch lane at a notification position a predetermined distance before a reference position at which the branching of the branch lane starts;
acquiring a travel distance in the branch lane, an elapsed time in the branch lane, and information indicating passage of an end position of the branch lane detected based on map information or external environment recognition information, after the lane change is completed by crossing a division line of the traveling lane; and
ending the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information.

15. A non-transitory computer readable storage medium storing a program for causing a computer to execute the driving assistance method according to claim 14.

16. A driving assistance device in a vehicle, the driving assistance device comprising:
a control unit configured to perform a lane change from a traveling lane in which the vehicle travels to a branch lane branching from the traveling lane, by driving assistance capable of automatically performing the lane change on an initiative of a system,
wherein the control unit
acquires a travel distance in the branch lane, an elapsed time in the branch lane, and information indicating passage of an end position of the branch lane detected based on map information or external environment recognition information, after the lane change is completed by crossing a division line of the traveling lane,
ends the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information,
wherein the control unit has, as lane change assistance, a plurality of lane change functions including:
a function of automatically performing the lane change on the initiative of the system;
a driver-initiated lane change function of automatically performing the lane change for each instruction input by a driver; and
a function in which the system of the vehicle monitors states of lanes on left and right of the vehicle, notifies the driver of the lane to which the lane change is possible, and performs the lane change based on an operation of the driver.

17. A driving assistance method for a driving assistance device in a vehicle, the driving assistance method comprising:
performing a lane change from a traveling lane in which the vehicle travels to a branch lane branching from the traveling lane, by driving assistance capable of automatically performing the lane change on an initiative of a system;

acquiring a travel distance in the branch lane, an elapsed time in the branch lane, and information indicating passage of an end position of the branch lane detected based on map information or external environment recognition information, after the lane change is completed by crossing a division line of the traveling lane; and ending the driving assistance in the branch lane in a case where the travel distance exceeds a predetermined threshold distance, in a case where the elapsed time exceeds a predetermined threshold time, or in a case of passing through the end position of the branch lane detected based on the map information or the external environment recognition information, wherein the lane change is performed based on, as lane change assistance, a plurality of lane change functions including:
- a function of automatically performing the lane change on the initiative of the system;
- a driver-initiated lane change function of automatically performing the lane change for each instruction input by a driver; and
- a function in which the system of the vehicle monitors states of lanes on left and right of the vehicle, notifies the driver of the lane to which the lane change is possible, and performs the lane change based on an operation of the driver.

* * * * *